(12) United States Patent
Pepperell et al.

(10) Patent No.: US 11,353,953 B2
(45) Date of Patent: Jun. 7, 2022

(54) METHOD OF MODIFYING AN IMAGE ON A COMPUTATIONAL DEVICE

(71) Applicant: FOVO TECHNOLOGY LIMITED, Cardiff (GB)

(72) Inventors: Robert Pepperell, Cardiff (GB); Alistair Burleigh, Cardiff (GB)

(73) Assignee: FOVO TECHNOLOGY LIMTED, Cardiff (GB)

( * ) Notice: Subject to any disclaimer, the term of this patent is extended or adjusted under 35 U.S.C. 154(b) by 0 days.

(21) Appl. No.: 16/645,271

(22) PCT Filed: Aug. 20, 2018

(86) PCT No.: PCT/GB2018/052353
§ 371 (c)(1),
(2) Date: Mar. 6, 2020

(87) PCT Pub. No.: WO2019/048820
PCT Pub. Date: Mar. 14, 2019

(65) Prior Publication Data
US 2020/0285308 A1 Sep. 10, 2020

(30) Foreign Application Priority Data

Sep. 6, 2017 (GB) .................................... 1714353

(51) Int. Cl.
*G06T 19/00* (2011.01)
*G06F 3/01* (2006.01)
(Continued)

(52) U.S. Cl.
CPC .............. *G06F 3/013* (2013.01); *G06F 3/012* (2013.01); *G06T 19/003* (2013.01); *G06V 20/64* (2022.01)

(58) Field of Classification Search
None
See application file for complete search history.

(56) References Cited

U.S. PATENT DOCUMENTS 8,218,895 B1 7/2012 Gleicher et al.
2008/0199049 A1* 8/2008 Daly .................. G09G 5/00
382/107
(Continued)

FOREIGN PATENT DOCUMENTS

WO 2009018557 A1 2/2009
WO 2014/122477 A1 8/2014
WO 2014122477 A1 8/2014

OTHER PUBLICATIONS

International Search Report of PCT/GB2018/052353 dated Oct. 24, 2018.
(Continued)

*Primary Examiner* — Tize Ma
(74) *Attorney, Agent, or Firm* — Polsinelli PC

(57) ABSTRACT

A method of modifying an image on a computational device is disclosed. The method comprises providing image data representative of at least a portion of a three-dimensional scene, the scene being visible to a human observer from a viewing point when fixating on a visual fixation point within the scene; displaying an image by rendering the image data on a display device; capturing user input by user input capturing means, wherein capturing comprises monitoring a point of gaze of a user so as to determine a spatial coordinate in the three dimensional scene, the coordinate representing a movable visual fixation point of the human observer; computationally processing the image data so as to enclose each object of the three dimensional scene in a three dimensional detection region which is configured to identify coincidence of the respective object with the visual fixation point; modifying the image by: computationally isolating a fixation region within the image, the fixation region being defined by a subset of image data representing an image object within the image, wherein the image object is associated with the visual fixation point; spatially reconstructing (Continued)

the subset of image data to computationally expand the fixation region; spatially reconstructing remaining image data relative to the subset of image data to computationally compress a peripheral region of the image relative to the fixation region in a progressive fashion as a function of a distance from the fixation region, the method further comprising determining a distance between a head of the user and the display device; computationally processing the image data so as to move the fixation region towards a centre of a display of the display device, wherein the fixation region represents the object enclosed by the respective detection region; wherein the computational expansion of the fixation region and the computational compression of the peripheral region are modulated by the distance between the head of the user and the display device.

12 Claims, 11 Drawing Sheets

(51) Int. Cl.
*G06K 9/00* (2006.01)
*G06V 20/64* (2022.01)

(56) References Cited

U.S. PATENT DOCUMENTS

| | | |
|---|---|---|
| 2011/0085700 A1 | 4/2011 | Lee |
| 2012/0147133 A1 | 6/2012 | Hadwiger et al. |
| 2013/0178287 A1 | 7/2013 | Yahav |
| 2014/0125761 A1 | 5/2014 | Morimura et al. |
| 2014/0208263 A1 | 7/2014 | Maklouf |
| 2014/0237366 A1 | 8/2014 | Poulos et al. |
| 2014/0247277 A1* | 9/2014 | Guenter .................. G06T 11/40 345/611 |
| 2015/0103003 A1 | 4/2015 | Kerr et al. |
| 2015/0309571 A1 | 10/2015 | Cheng et al. |
| 2015/0363905 A1* | 12/2015 | Pepperell .............. G06T 3/0037 345/427 |
| 2017/0011492 A1* | 1/2017 | Thunstrom ............. G06F 3/013 |
| 2018/0357749 A1* | 12/2018 | Young ..................... G06T 11/40 |
| 2019/0116353 A1* | 4/2019 | Lodato .................. A61B 3/024 |

OTHER PUBLICATIONS

Written Opinion of PCT/GB2018/052353 dated Oct. 24, 2018.
Search Report of Great Britain Application No. 1714353.8 dated Jul. 13, 2018.
Communication pursuant to Article 94(3) EPC dated Jun. 25, 2021 in corresponding European Patent Application No. 18759713.3, 5 pages.
Cha Zhang et al: 'Improving depth perception with motion parallax and its application in teleconferencing'; MMSP'09, Oct. 5-7, 2009.
Zhu Zhe et al: '3D modelling and motion parallax for improved videoconferencing' vol. 2, No. 2, Jun. 2016, 131-142.
European Office Action dated Oct. 14, 2021 for corresponding European Patent Application No. 18759712.5, 6 pages.
Baldwin et al.: "The Perceived Size and Shape of Objects in Peripheral Vision", Aug. 17, 2016.
Pepperell, "The Perception of Art and the Science of Perception", Feb. 2012.
International Search Report and Written Opinion issued in corresponding International Application No. PCT/GB2018/052352.
Search Report issued in corresponding GB Patent Application No. 1714341.3.

* cited by examiner

METHOD OF MODIFYING AN IMAGE ON A COMPUTATIONAL DEVICE

The invention relates to a method of allowing a user of the computational device to modify and explore a computer generated three dimensional scene by altering the three dimensional geometry of the scene based on input from eye and head tracking sensors.

The human visual system is highly complex, consisting of many interacting processes some of which occur in the visual areas of the brain and others in the physiology of the body. Natural visual perception relies on the ability of humans to move their eyes and heads. Eye motion allows us to track moving objects, scan the environment, and resolve perceptual ambiguities, all of which can be enhanced by co-ordinated head motion. In normal vision the eyes are moving constantly while it is rare the head is completely still, and it has long been known that loss of eye motion can seriously impair visual perception. Like many creatures, humans are able to move the eyes and heads differentially as well as in coordination. For example, we can fixate on a stable point in space while at the same turning our heads. Even though our heads are in motion the perceptual stability of the fixated point in space is maintained.

Computer graphics systems are increasingly used to model and display 3D scenes, and there are a growing number of methods of interacting with these 3D scenes in order to create immersive experiences, such as via infrared motion and 3D sensors, joysticks, computer mice, head and eye trackers, and joy pads.

Current 3D computer graphics environments are not naturalistic in that they rely on a range of artificial behaviours, conventions and perceptual cues to display 3D space and allow the user to explore it. For example, in natural vision we move our eyes and heads to see different parts of a space, but in computer graphics we move a mouse, joystick or other device to reorient the 3D scene to the desired position in the image display. As another example, 3D computer graphics environments frequently use the geometry of linear perspective to render a 3D scene to a 2D display, which is inadequate for rendering wide-angle views of 3D scenes as it results in distortions at the edges of the 3D scene and excessive minification of objects in the centre of the 3D scene.

A further limitation of many 3D computer graphics systems is that in many cases only a relatively small portion of the 3D scene can be shown on the image display device at any one time. Virtual cameras using linear perspective, for example, will typically display around 40-60° horizontally of a 3D scene, while normal humans would see approximately 180° horizontally of a real 3D scene. Greater angles of view can be achieved with computationally generated fisheye lenses or equirectangular projections, but these typically result in further unnatural looking distortions of the image. This narrow field of view is a limitation in many implementations of 3D graphics, such as in head mounted displays or 360° videos on mobile devices, where the user is required to move their head or the device around in space in order to navigate or explore the 3D scene, and this can lead to physical discomfort and fatigue.

A further problem is that images generated according to the principles of linear perspective characteristically appear flat when compared to our experience of the 3D real world they represent, or fail to represent visual space in the way humans naturally perceive it. These problems occur for several reasons, including the fact that depth cues in an image (such as occlusion, parallax, shading, etc.) are suppressed by the cues showing the image is flat (such as the geometry of the image plane, surface glare from the screen, etc.). A further reason is, as noted above, that the organisation of the visual space in images generated by conventional geometric methods is not perceptually natural because objects can become excessively magnified or minified in ways that appear distorted when the image is viewed from anywhere other than the correct centre of projection.

A further problem is that images generated according to the principles of linear perspective are not geometrically modified according to the visual fixation coordinate of the viewer of the image. Linear perspective images have one or more vanishing points, but these points do not necessarily coincide with, or accurately represent, the viewpoint of the viewer looking around a 3D scene, which may vary without geometric modification of the 3D scene. It is possible to move the position of the virtual camera in the 3D scene to emulate the motion of the eyes of the viewer scanning a scene, but this results in an unnatural and uncomfortable camera motion.

Methods exist that attempt to address the above-mentioned problems and limitations. For example, methods have been developed that use eye tracking interfaces to allow the user to select regions of the scene, or 'hotspots', by moving the eyes, and these hotspots act in the same way a computer mouse click or similar user input would act to trigger a further action, such as moving the 3D scene to the left or right, or exploring a space. Further methods have been developed that use head tracking sensors to detect the position and movement of the head of the user in order to control the direction and motion of a virtual camera in the 3D space. However, such methods generally rely on the geometry of linear perspective to render the 3D scene to an image display, and therefore suffer the same limitations of any method reliant on this geometry. For example, these methods limit the amount of the 3D scene visible on the display at any one time, this being far less than would be visible in natural vision, and so require the user to undertake uncomfortable or unnatural behaviours in order to view the full scope of the scene, or to navigate it comfortably.

U.S. patent application Ser. No. 14/763,454 discloses a method of making an image of a scene (including a scene made by the method) generally corresponding to that perceived by the human brain via the human eyes, the method including the steps, in any suitable order, of: capturing, recording, generating, or otherwise representing a scene consisting of the entire field of view, or part thereof, visible to a human observer from a given 'Viewing Point' (VP) when fixating on a given region within the scene, progressively enlarging the image towards the area of the scene, and progressively compressing the area of the scene corresponding to the peripheral field of vision to thereby produce a modified image of the scene generally corresponding to how the scene would appear to the human perceiver.

It is an object of the present invention to provide a technical solution to at least some of the issues outlined above.

In accordance with a first aspect of the present invention, there is provided a method of modifying an image on a computational device including the steps of providing image data representative of at least a portion of a three-dimensional scene, the scene being visible to a human observer from a viewing point when fixating on a visual fixation point within the scene; displaying an image by rendering the image data on a display device; capturing user input by user input capturing means, wherein capturing comprises monitoring a point of gaze of a user so as to determine a spatial coordinate in the three dimensional scene, the coordinate representing a movable visual fixation point of the human observer; computationally processing the image data so as to enclose each object of the three dimensional scene in a three dimensional detection region which is configured to identify coincidence of the respective object with the visual fixation point; modifying the image by: computationally isolating a fixation region within the image, the fixation region being defined by a subset of image data representing an image object within the image, wherein the image object is associated with the visual fixation point; spatially reconstructing the subset of image data to computationally expand the fixation region; spatially reconstructing remaining image data relative to the subset of image data to computationally compress a peripheral region of the image relative to the fixation region in a progressive fashion as a function of a distance from the fixation region, the method further comprising determining a distance between a head of the user and the display device; computationally processing the image data so as to move the fixation region towards a centre of a display of the display device, wherein the fixation region represents the object enclosed by the respective detection region; wherein the computational expansion of the fixation region and the computational compression of the peripheral region are modulated by the distance between the head of the user and the display device.

In an embodiment, a size of the detection region can be adjusted. The detection region may extend beyond boundaries of the respective object.

In an embodiment, a detection sensitivity may be defined for the detection region, the detection sensitivity defining an extent to which the respective object is identified as coinciding with the visual fixation point, wherein the detection region has the lowest detection sensitivity proximate boundaries of the detection region. The detection sensitivity may be inversely proportional to a distance from the boundaries of the respective object.

In an embodiment, the steps of providing the image data and computationally processing the image data may be performed before the step of displaying the image on the display device.

In an embodiment, the may further comprise a step of detecting a motion of the head of the user relative to the display device.

In an embodiment, the method may further comprise a step of computationally moving the peripheral region relative to the fixation region in accordance with the motion of the head of the user so as to emulate a moving field of view of the human observer while maintaining a position of the visual fixation point.

In an embodiment, the method may further comprise a step of detecting entry of the visual fixation point into the detection region.

In an embodiment, computationally isolating the fixation region may comprise predicting an object within the three dimensional scene upon which the user will fixate based on a velocity value and direction of the movable fixation point.

In an embodiment, the fixation region may be moved towards the centre of the display at the same time as the fixation point moves towards the fixation region.

In an embodiment, the image data may comprise three-dimensional computer generated data.

In accordance with a second aspect of the present invention, there is provided a computer system configured to implement steps of the method according to the first aspect, the system comprising: user input capturing means configured to capture user input; a control unit configured to generate a processed image data based on the captured user input; a display device configured to display the processed image data.

In an embodiment, the system may further comprise image capturing means configured to capture the image data which represents a three dimensional scene.

In an embodiment, the system may further comprise a depth sensor configured to capture depth information from the three-dimensional scene and wherein the control unit is configured to process the captured image data along with the captured depth information.

In an embodiment, the user input capturing means may comprise a display device motion sensor configured to capture motion applied to the display device.

In an embodiment, the user input capturing means may comprise a user motion sensor configured to capture motion of the user relative to the display device.

In an embodiment, the user input capturing means may comprise a touchscreen configured to be integrated with the display device.

In an embodiment, the system may further comprise a graphics processor configured to process the captured image data so as to generate a modified image data.

In an embodiment, the system may further comprise a memory storage configured to store the image data and communicate the image data to the control unit or the graphics processor when present.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings, in which.

Figure 1:
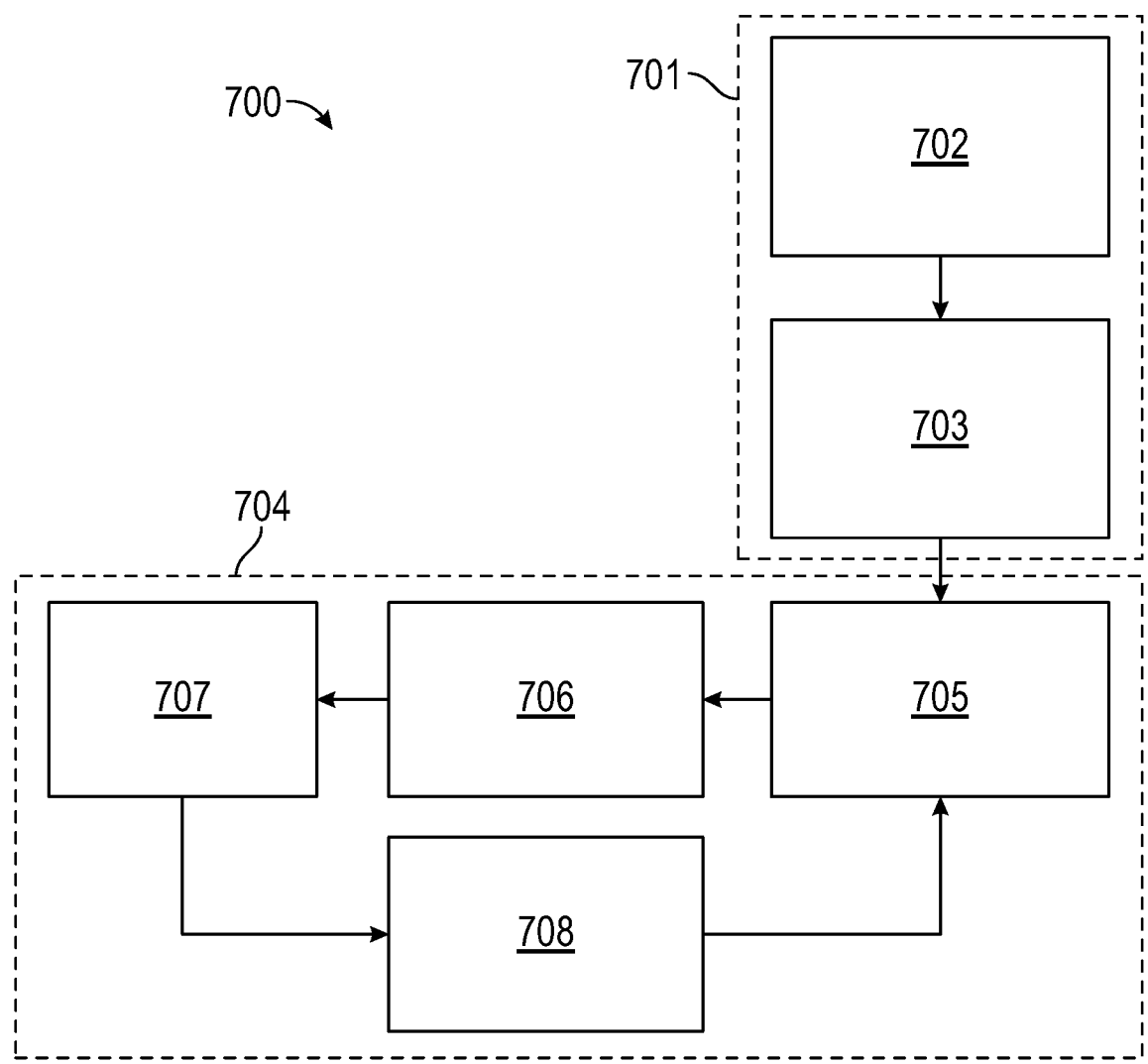
FIG. 1 illustrates a flow chart of the steps of the method of modifying three dimensional computer generated scenes according to a an embodiment of the present invention.

FIG. 1 is a flow chart 700 of the steps of a method according to a first embodiment of the present invention. Beginning in the box 701, the 3D data is accessed at step 702 and at step 703, objects in the scene are assigned a region of interest function. Moving into the box 704, the visual fixation coordinate is set at step 705, using one of several processes as specified herein, and the distance of the head of the user from the image display is measured at step 706, via the eye or head tracking sensors. The magnification/minification function is then applied at step 707, and the geometry of the 3D is modified at step 708 according to the parameters set in the previous steps. There are several computational techniques that can be used to effect the spatial modifications specified, such as expansion (magnification) or compression (minification) in the present invention, and which could be implemented by a person skilled in the art. By way of example only, one technique is to apply a suitable mesh transformation to the 3D coordinates used to model the 3D scene, or the 2D image of the 3D scene. Another technique is to apply a suitable matrix transformation to the computer data used to represent the light paths in the 3D scene. This information is then updated with a new visual fixation coordinate. Box 701 represents the pre-run time steps in the method, and box 704 represents the run time steps.

At step 702, a computer function accesses the computational data used to model the 3D scene and stored in the memory device. At step 703, each of the 3D objects in the scene is assigned a region of interest, this being a function that defines a 3D volume enclosing the outer coordinates of the object, but extending beyond its contours to an extent that can be defined by a suitable user control interface, or determined by parameters pre-programmed into the device by a person skilled in the art. This volume acts as a visual fixation coordinate detection function and is incrementally calibrated, using computational techniques known to a person skilled in the art, such that the sensitivity of the function is lower at the outer extremities of the region and increases as it approaches the boundary of the object, being at its greatest sensitivity within the boundaries of the object. The two steps above, encapsulated in box 701 in the figure, are executed prior to the image being displayed, that is, pre-run time.

In a further step, the image of the 3D scene is displayed on the Image Display and the visual fixation coordinate is set at step 705, this being determined by data passed to the Central Processor from the eye tracking device, or similar suitable device, connected to or integrated within the device embodying the present method. The visual fixation coordinate is a computer coordinate in the 3D space of the scene, corresponding to the location of the gaze of the user looking at the Image Display. Optionally, the visual fixation point might be set by input from the User Interface, via a computer mouse, a joy pad or other suitable device.

At step 706, the distance of the head of the user from the Image Display is determined via a head tracker or other suitable sensor.

At step 707, the image is modified in the following way. The region of the image corresponding to the visual fixation coordinate is magnified to a degree determined by the distance of the head of the user from the Image Display. The remainder of the image is minified to a degree determined by the distance of the head of the user from the Image Display and to a degree that increases as a function of the distance from the visual fixation coordinate in all directions, including the depth axis of the 3D scene. The degree of magnification and minification applied to the geometry of the 3D scene is constrained by parameters programmed into the device embodying the method by a person skilled in the art, but the degree of magnification may be between 100% and 200% and the degree of minification may be between 100% and 10%, the greatest degree of minification being applied to the regions of the 3D scene furthest from the visual fixation coordinate, including in the depth axis of the 3D scene.

At step 708, the location of the visual fixation coordinate is used to determine the appearance of the 3D scene with respect to the user. If the visual fixation coordinate is moved to a different region of the image display, as detected by the visual fixation moving within the region of interest of another object, then the 3D scene is geometric modified such that the object moves towards the centre of the image display. Further, the object associated with the visual fixation coordinate is magnified and the remainder of the scene is minified, as per the present method, and the field of view of the scene is maintained by further modifying the remainder of the 3D scene with respect to the visual fixation coordinate.

In a further step, the device embodying the method monitors the current visual fixation coordinate, as determined by the behaviour of the eye of the user as detected via the eye tracker or a suitable sensor, and updates the device accordingly. This creates a run time loop, containing the steps shown in the box labelled B in the drawing in which continual updates from the eye tracking data modify the image in real time.

Figure 2:
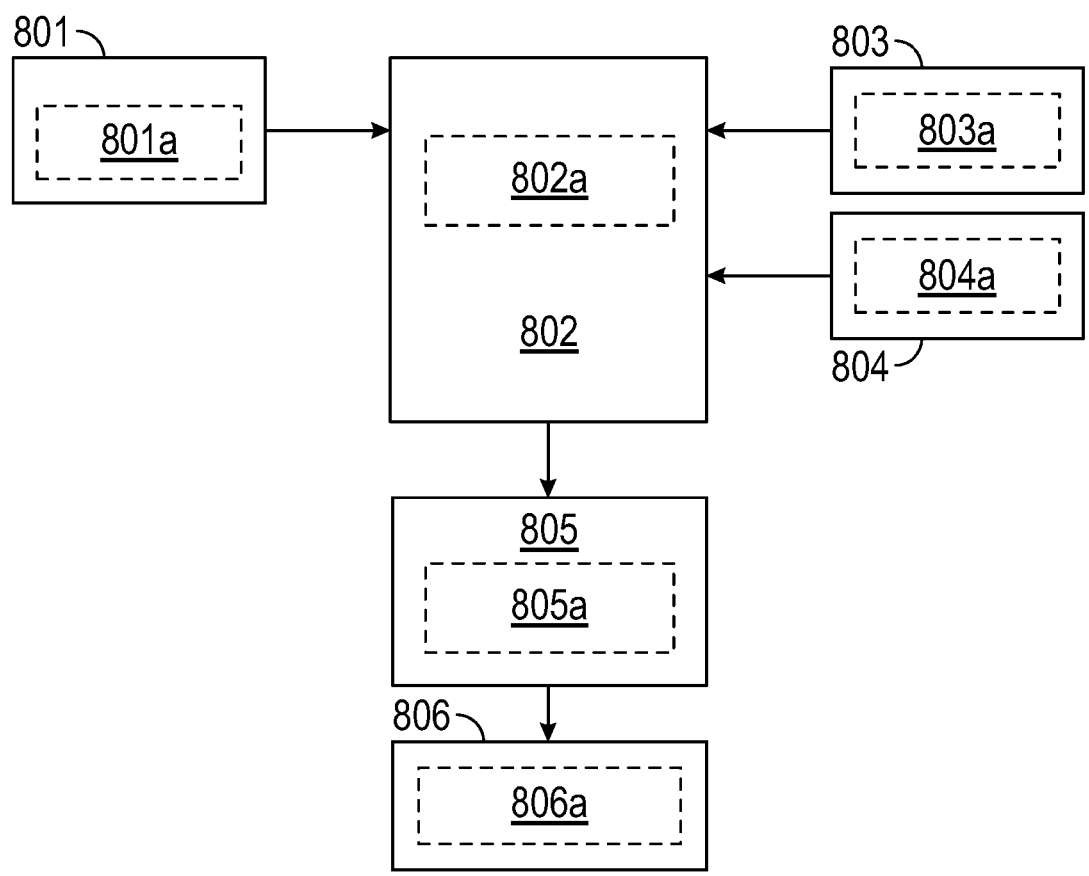
FIG. 2 illustrates a block diagram of a computer system implementing steps of the method of FIG. 1.

FIG. 2 is a flow chart 800 illustrating an example of a computational device for embodying the method according to an embodiment of the present invention. A memory storage device 801 contains the data 801a used to model the 3D scene, this data 801a being passed to the Central Processor 802 in so as to obtain a modified data 802a. The Central Processor 802 can receive data from motion sensing devices 803, such as eye trackers and head trackers 803a or similar devices, and values that control execution of the steps of the method according to the second embodiment as set by a user of the device via a suitable User Interface 804 such as a computer mouse, a joy pad or similar device 804a. Data is passed to the Graphics Processor 805 to be processed to generate a modified image 805a, and prepared for rendering to the Image Display 806, on which the resulting image 806a is viewed. The Image Display 806 may consist of any suitable device for presenting an interactive moving image to a person, including electronic monitors, video projections, stereoscopic head mounted displays, holographic displays, volumetric displays, planar or non-planar display surfaces, or other such devices.

Figure 3:
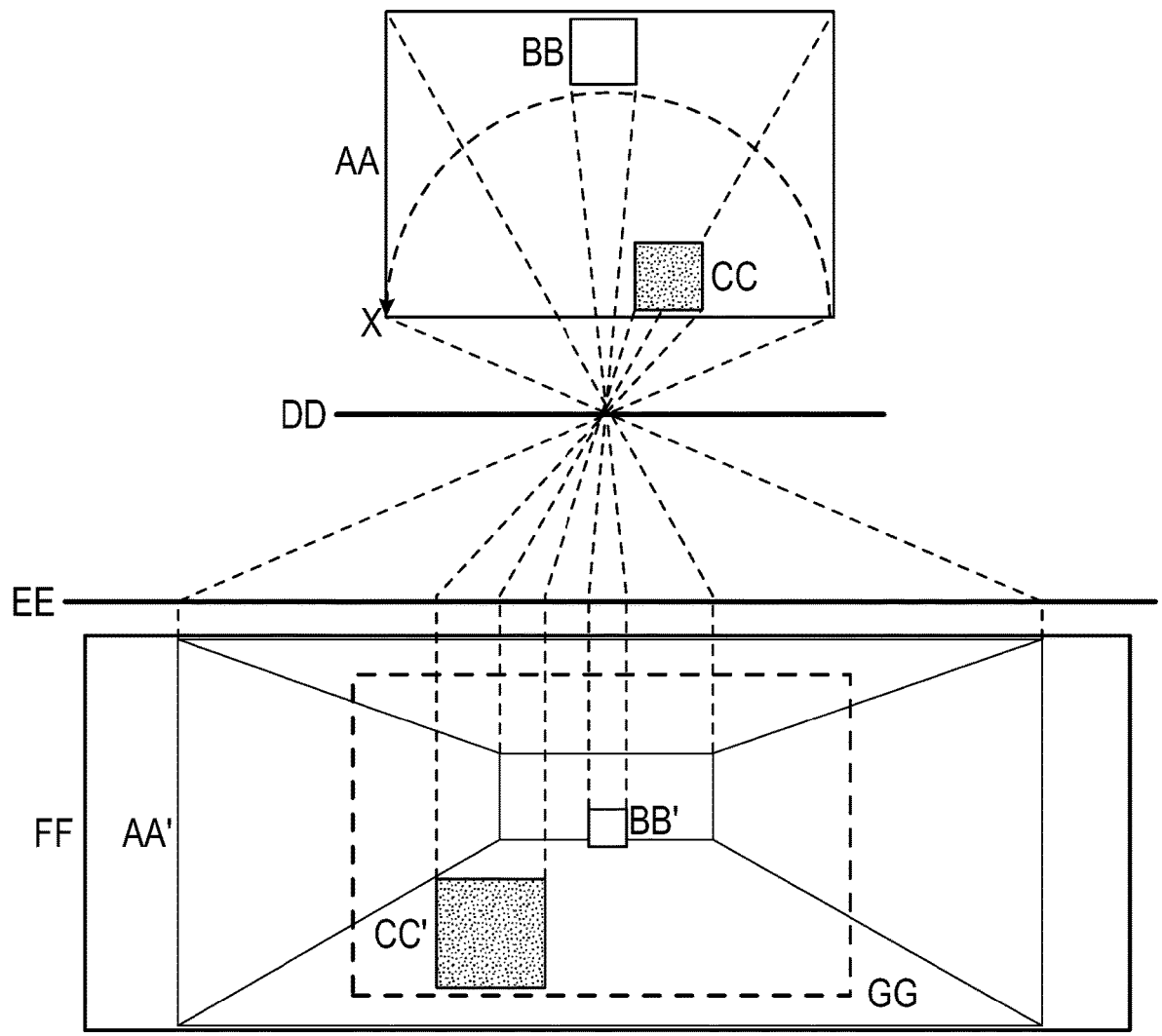
FIG. 3 illustrates an example explaining geometric principles of linear perspective.

FIG. 3 illustrates the geometric principles of linear perspective. The drawing shows a plan view of a room at AA containing a cube close to the back wall at BB. At CC is an identically sized cube close to the front of the room, which is open to view. DD is a light barrier with a centrally located aperture through which light rays, indicated by dashed lines, from selected points in the scene pass in straight lines to intersect with the projection plane at EE. FF shows an elevated view of a screen on which the projection of light at EE is rendered as an image. Dashed lines perpendicular to EE map the light rays from EE to their positions in the image at FF. AA', BB' and CC' show how AA, BB, and CC will appear in the image at FF and the bold dashed line at GG indicates the crop factor of a conventional imaging device, such as a 35 mm photographic camera, meaning that only the region of the image inside the dashed line would be visible to the user. The dashed arc ending at x indicates the horizontal angle of view of the image of the scene, which is 120° in this case.

The image on the screen at FF shows a wide-angle view (120° horizontally) of the room, which is shown in plan view at AA. Note that due to the wide angle of view of the 3D scene the cube in the room at BB appears excessively small in the image at BB', while the walls of the room appear excessively stretched at AA'. The forward-most cube at CC appears excessively large when projected to CC', and when the standard camera crop frame, indicated by the dashed line at GG, is applied much of the room falls outside the visible area. For the purposes of representing the room in a perceptually natural way, this method is inadequate.

In theory, the apparent distortions of size and shape in this image of the room could be neutralised if the viewer adopts the correct centre of the projection as the viewing point. Under these conditions the pattern of light rays entering the pupil of the eye would closely approximate those projecting from the real scene. However, for wide-angle views the centre of projection would be too close to the image plane to allow the eye of the view to focus comfortably, unless the image was made impractically large.

Figure 4:
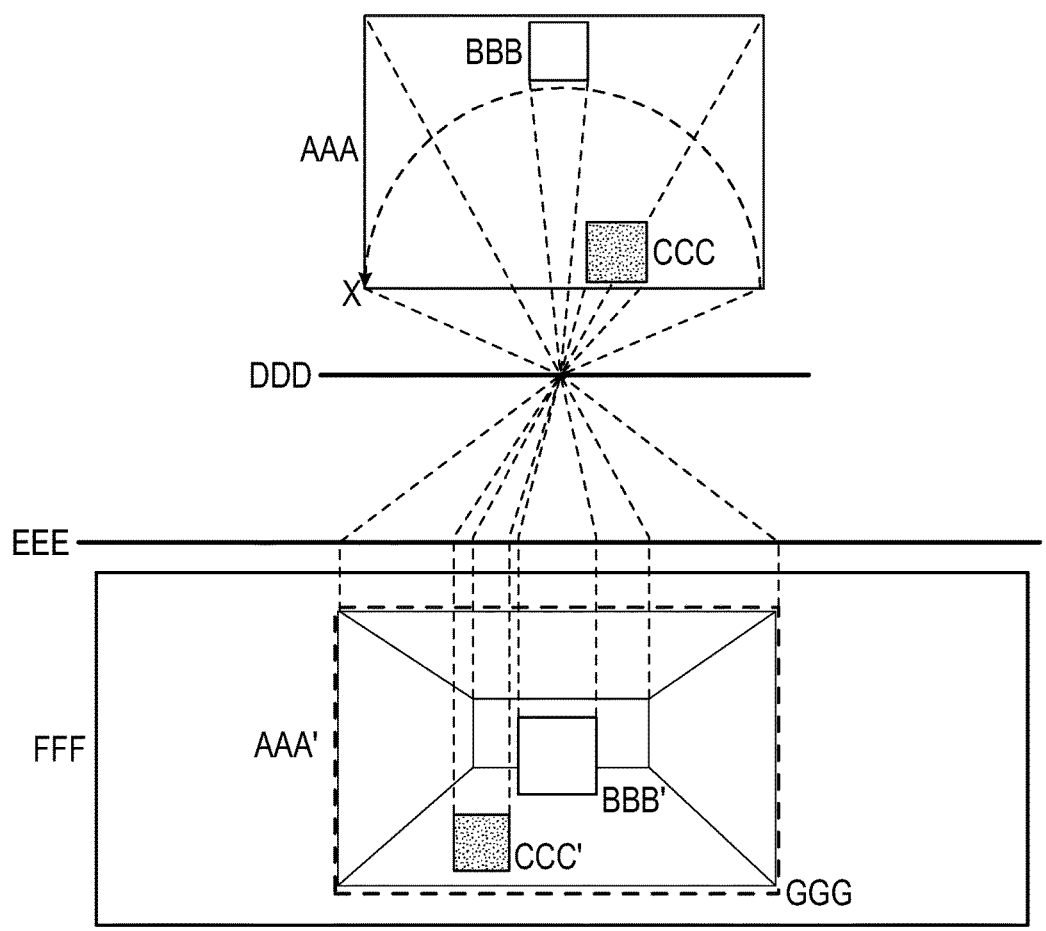
FIG. 4 illustrates image modification principle of the present invention.

FIG. 4 illustrates the image modification principle employed in the present invention. The drawing shows a plan view of a room at AAA containing a cube close to the back wall at BBB. At CCC is an identically sized cube close to the front of the room, which is open to view. DDD is a light barrier with a centrally located aperture through which light rays, indicated by dashed lines, from selected points in the scene pass in straight lines to intersect with the projection plane at EEE. FFF shows an elevated view of a screen on which the projection of light at EEE is rendered as an image. Dashed lines perpendicular to EEE map the light rays from EEE to their positions in the image at FFF. AAA', BBB' and CCC' show how AAA, BBB, and CCC will appear in the image at FFF and the bold dashed line at GGG indicates the crop factor of a conventional imaging device, such as a 35 mm photographic camera, meaning that only the region of the image inside the dashed line would be visible to the user. The dashed arc ending at x indicates the horizontal angle of view If the image of the scene, which is 120° in this case. Note that for the purposes of legibility only the front face of the cubes are shown at FFF.

The same room as in FIG. 3 is shown but the paths of the rays of light projected onto the image plane at EEE are non-linear, resulting in a modified image of the 3D scene. The rays of light projecting from the cube at BBB are non-linear is a way specified in the present invention, being more divergent at the aperture than in FIG. 3, resulting in a magnification of the cube at BBB' relative to the projection in FIG. 3. The rays of light projecting from the outer edges of the room are more convergent at the aperture than in FIG. 3, resulting in a minification the outer walls of the room at AAA'. Since the cube CCC is closer to EEE than BBB, it is also minified when projected at CCC' according to the present invention. The wall behind the cube at BBB is also minified according to the present invention, and is shown in the drawing as smaller in the image at AAA' in proportion to the cube at BBB' than in FIG. 3. The effect of these modifications is that the relative size of objects in the 3D scene is modified as a function of their location in the depth axis of the 3D scene according to the present invention.

Note that in the projection of the room shown in FIG. 4 the entire room is visible within the standard camera crop frame at GGG. This method results in an image of the scene that is more perceptually natural, more comfortable to view, and has greater perceptual depth than an image generated according to the geometry of linear perspective.

The degree of magnification and minification applied to the scene in the drawing is shown for the purposes of illustration only, and does not indicate the precise or only degree of modification.

Figure 5:
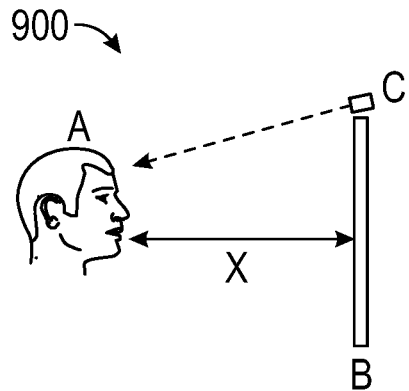
FIG. 5 illustrates a schematic diagram of a step of the method of FIG. 1.
Figure 5:
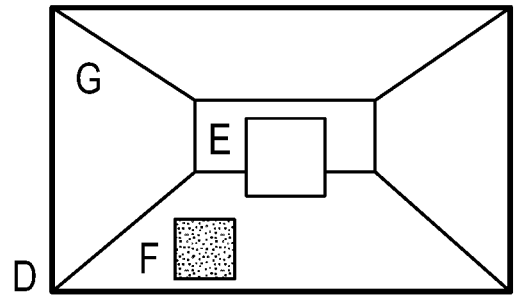
Figure 5:
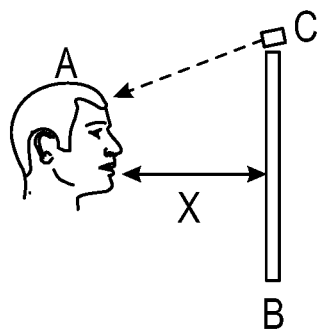
Figure 5:
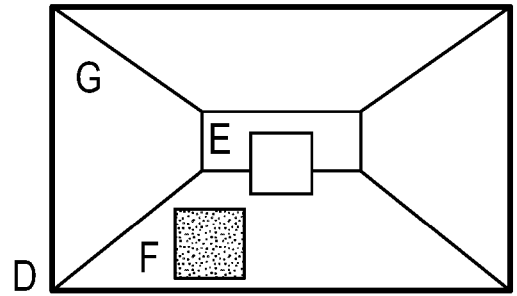
Figure 5:
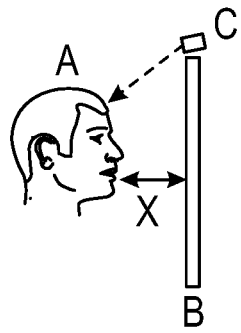
Figure 5:
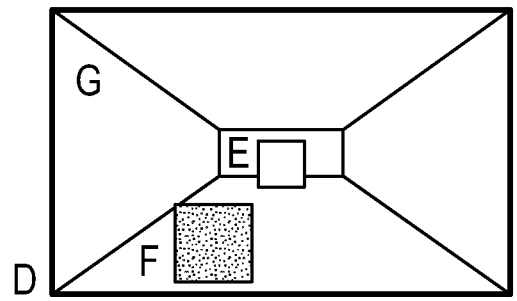

FIG. 5 shows a schematic diagram 900 illustrating a subset of the steps of the second embodiment. The geometry of the 3D scene is modified according to the position of the viewer in relation to the image display. In scenario 1, the user is located at A and at a distance x from the image display at B. C is a depth sensing device, head tracker, or similar suitable sensor for measuring the location of the head of the user. The image at D shows a 3D scene and how the scene would be modified. Scenario 2 shows the same setup, but this time the user has moved closer to the image display, as detected by the sensor at C and measured as x. Now the equivalent image at D is further modified such that the cube at E is smaller than in scenario 1 and the cube at F is larger. The width of the wall at G is also greater, while the wall behind the cube at E is smaller. In scenario 3, the head of the user is closer still to the image display, and the consequent modifications to the image at D are illustrated. Greater minification has been applied to the central cube at E, and great magnification applied to the cube at F. The size of the walls at G has also been increased, while the wall behind the cube at E is smaller.

The ratio of head distance to image object size can be varied by parameters as will be known to a person skilled in the art, by suitable algorithms, or in response to settings determined by the user of the device passed from the User Interface. In all cases, however, the relationship between head distance and object size will be proportionate such that increasing the distance by 1% increases the magnification factor by between 1% and 100% and the minification factor by between 1% and 100%, while decreasing the distance by 1% decreases the magnification factor by between 1% and 100% and the minification factor by between 1% and 100%. The magnification and minification modifications to the geometry of the 3D scene are applied to the depth axis of the 3D scene in additional to the height and width axes.

Figure 6:
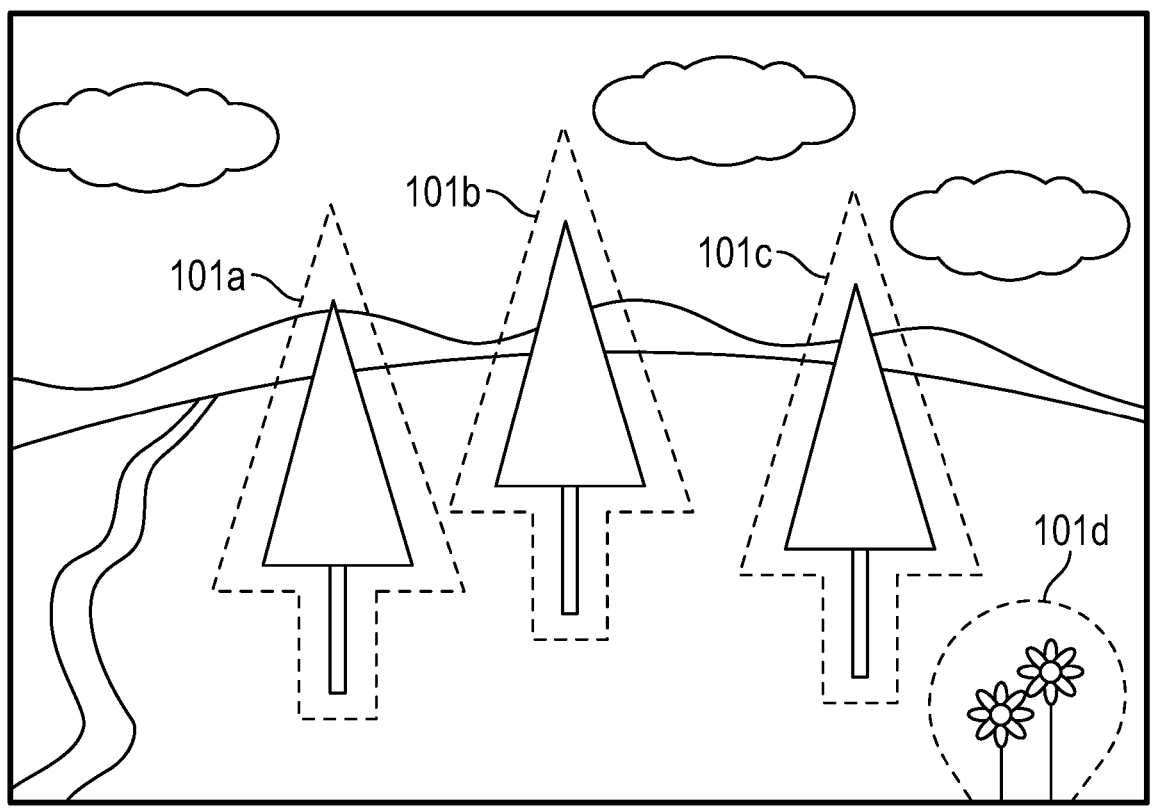
FIG. 6 illustrates an example scene showing a step of the method of FIG. 1.

FIG. 6 shows for the purposes of illustration only the principle disclosed in the present invention in which objects in a 3D scene 100 are assigned a region of interest function 101a, 101b, 101c, 101d, indicated in this drawing by the dashed lines surrounding the objects. Note these regions of interest extend beyond the contours of the objects they are assigned to. The region of interest function acts as a user interaction 'hotspot' by alerting the device embodying the method to the fact that the visual fixation of the user has coincided with the object in question, or is predicted to coincide with the object based on probabilistic calculations made by the device about the trajectory of the motion of the eye of the user, as detected by a suitable sensor, data from which is passed to the Central Processor, the calculations to be encoded in a suitable algorithm programmed into the device by a person skilled in the art. As noted, this region of interest is calibrated such that sensitivity increases as a function of proximity to the contours of the object, sensitivity being the measure extent to which the device identifies the object as coinciding with the visual fixation coordinate.

Figure 7:
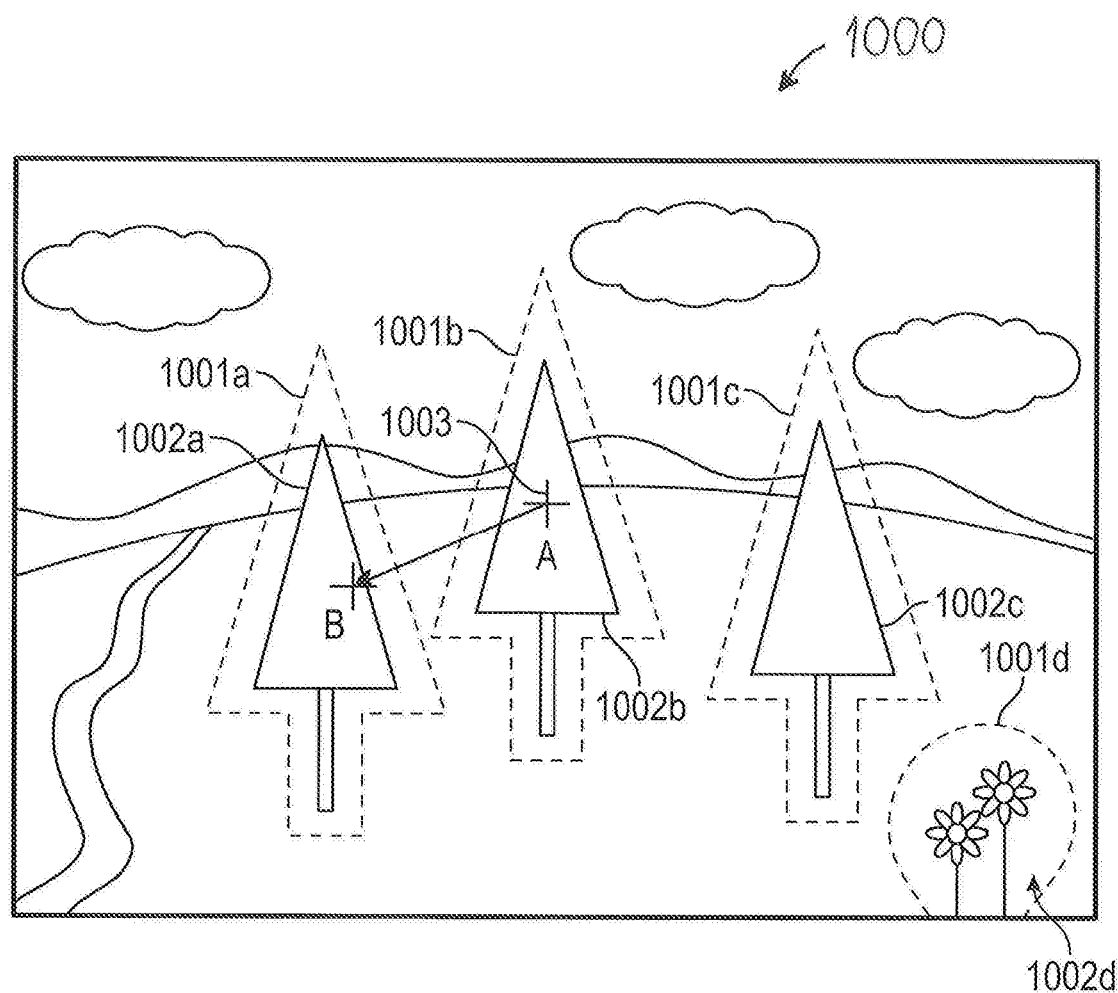
FIG. 7 illustrates an example scene showing a step of the method of FIG. 1.

FIG. 7 shows for the purposes of illustration only the principle disclosed in the present invention in which objects in a 3D scene 1000 are assigned a region of interest function 1001a, 1001b, 1001c, 1001d indicated in this drawing by the dashed lines surrounding the objects 1002a, 1002b, 1002c, 1002d, respectively. These regions 1001a, 1001b, 1001c, 1001*d* of interest extend beyond the contours of the objects 1002*a*, 1002*b*, 1002*c*, 1002*d* they are assigned to. The region of interest function acts as a user interaction 'hotspot' by detecting the fact that the visual fixation of the user has coincided with the object in question, or is predicted to coincide with the object based on probabilistic calculations made by the device about the trajectory of the motion of the eye of the user, as detected by a suitable sensor, data from which is passed to the Central Processor. The calculations to be encoded in a suitable algorithm programmed into the device by a person skilled in the art. As noted, this region of interest can be calibrated such that sensitivity increases as a function of proximity to the contours of the object, sensitivity being the measure of extent to which the device identifies the object as coinciding with the visual fixation coordinate. The visual fixation coordinate 1003, indicated in this drawing by the cross, is detected in region of interest 1001*b*, and therefore triggering the region of interest function for the respective object 1002*b*, then moves to the region of interest 1001*a* as the gaze of the user moves to this region 1001*a*, therefore triggering the region of interest function for the respective object 1002*a*.

Figure 8:
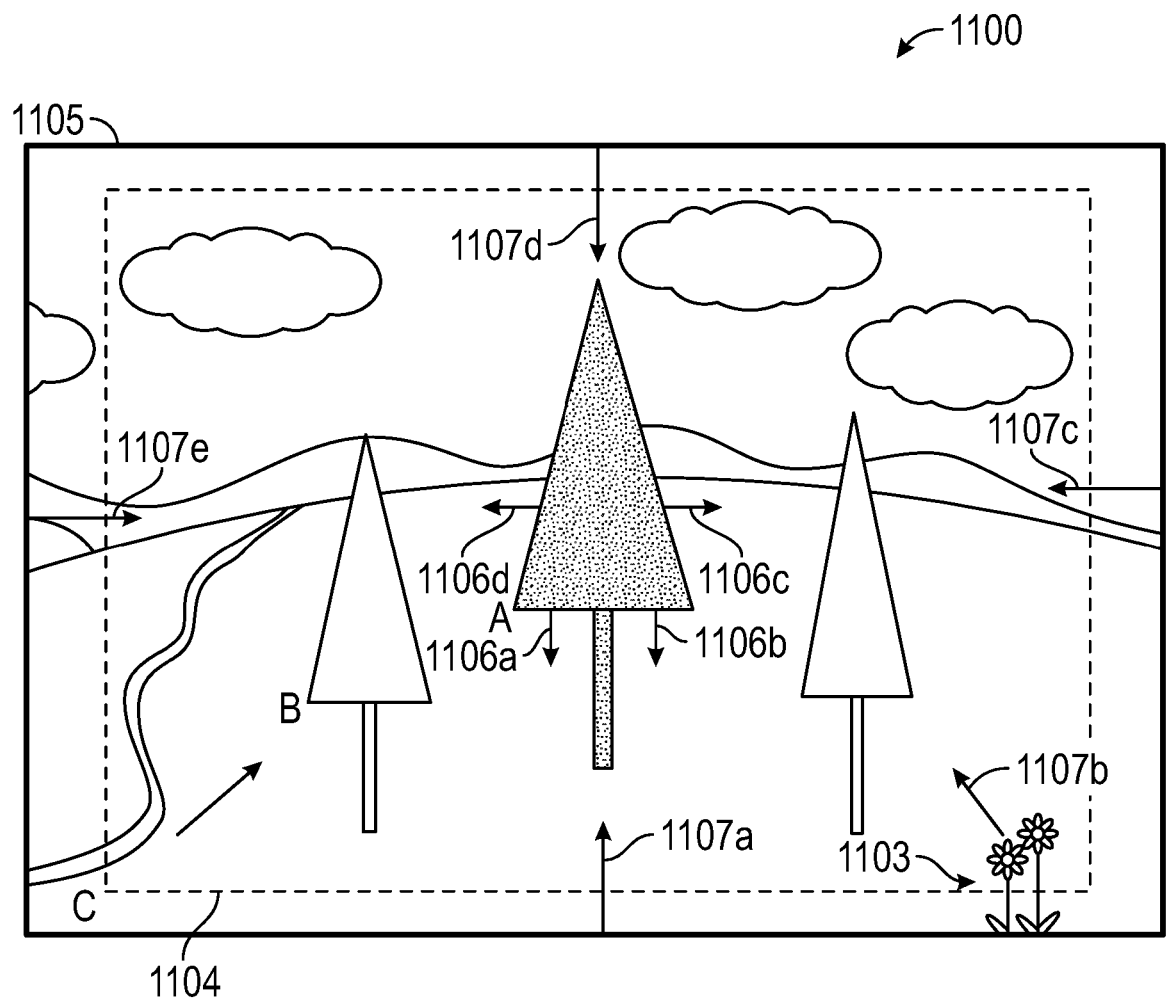
FIG. 8 illustrates an example scene showing a step of the method of FIG. 1.

FIG. 8 illustrates a scene 1100 showing magnifying the fixation region 1101 and minifying the remaining regions and objects in the scene 1100 and the effects on the tree 1101 and tree 1102, and the flowers at 1103. The dashed boundary at 1104 indicates the original angle of view of the image prior to modification according to the second embodiment, with the regions inside the dashed line being visible in the pre-modified version. The regions outside the dashed line now become visible within the frame 1105. The bold arrows 1106*a*, 1106*b*, 1106*c*, 1106*d* indicate the direction of magnification and the bold arrows 1107*a*, 1107*b*, 1107*c*, 1107*d*, 1107*e*, 1107*f* indicate the direction of minification.

The tree 1101, now shaded, is larger in the image 1105 than tree 1002*b* in FIG. 7 and the tree 1102 is smaller. The flowers 1103 in the bottom right corner of the image 1105, which are closer that the tree 1101, are now smaller but also visible in greater part than in FIG. 7. The dashed boundary 1104 shows the portion of the 3D scene visible within the image frame 1000 in FIG. 4, and FIG. 6 shows the additional areas of the 3D scene now visible within the image frame.

The degree of magnification and minification applied to the scene in the drawing is shown for the purposes of illustration only, and does not indicate the precise or only degree of modification.

Figure 9:
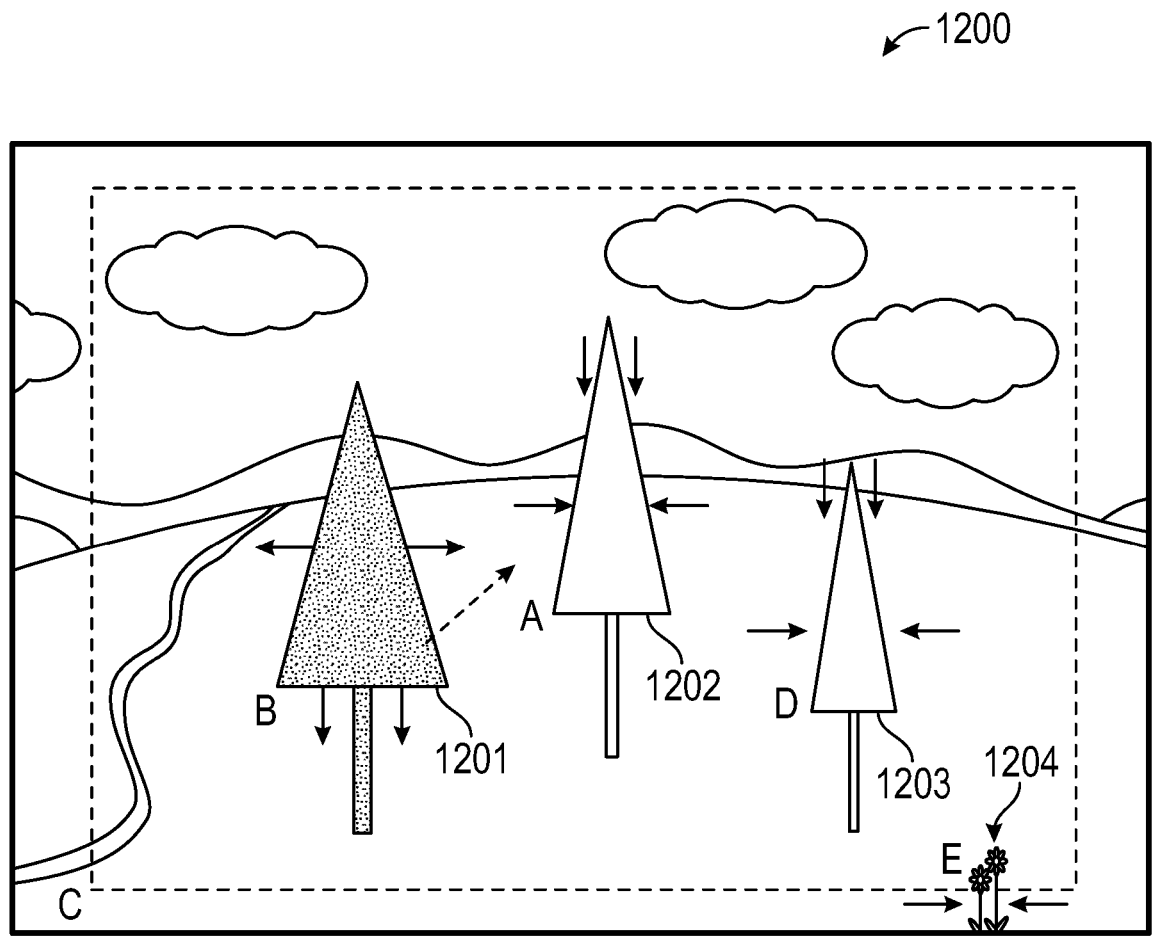
FIG. 9 illustrates an example scene showing a step of the method of FIG. 1.

FIG. 9 shows an example scene 1200 for the purposes of illustrating the step of moving the visual fixation coordinate to a new location in the 3D scene and the consequent modification to the geometry of the 3D scene. In this example, the visual fixation coordinate moves from the tree 1202 to the tree 1201. The geometry of the 3D scene is modified such that the tree 1201 is magnified and the tree 1202 is minified, and further that the tree 1203 is minified to a greater degree than in the vase shown in FIG. 8, as are the flowers 1204.

Modifying the geometry of the 3D scene is distinct from the process of moving a virtual camera within a conventional 3D computer graphics environment. The movement of a virtual camera in a conventional 3D scene with respect to the scene will generally re-project the scene according to the geometry of linear perspective, or another standard projective geometry such as fisheye or equirectangular, using a 3D coordinate matrix transformation. The geometrical coordinates of the 3D scene are modified in such a way that as the visual fixation coordinate moves to a new area of the 3D scene then the magnification and minification values are modified such that the new region is magnified and the remainder of the scene minified. The region being magnified is moved towards the centre of the image display, or some other area of the display as defined by the user. The field of view of the 3D scene, as visible on the image display, is maintained within the image display.

Figure 10:
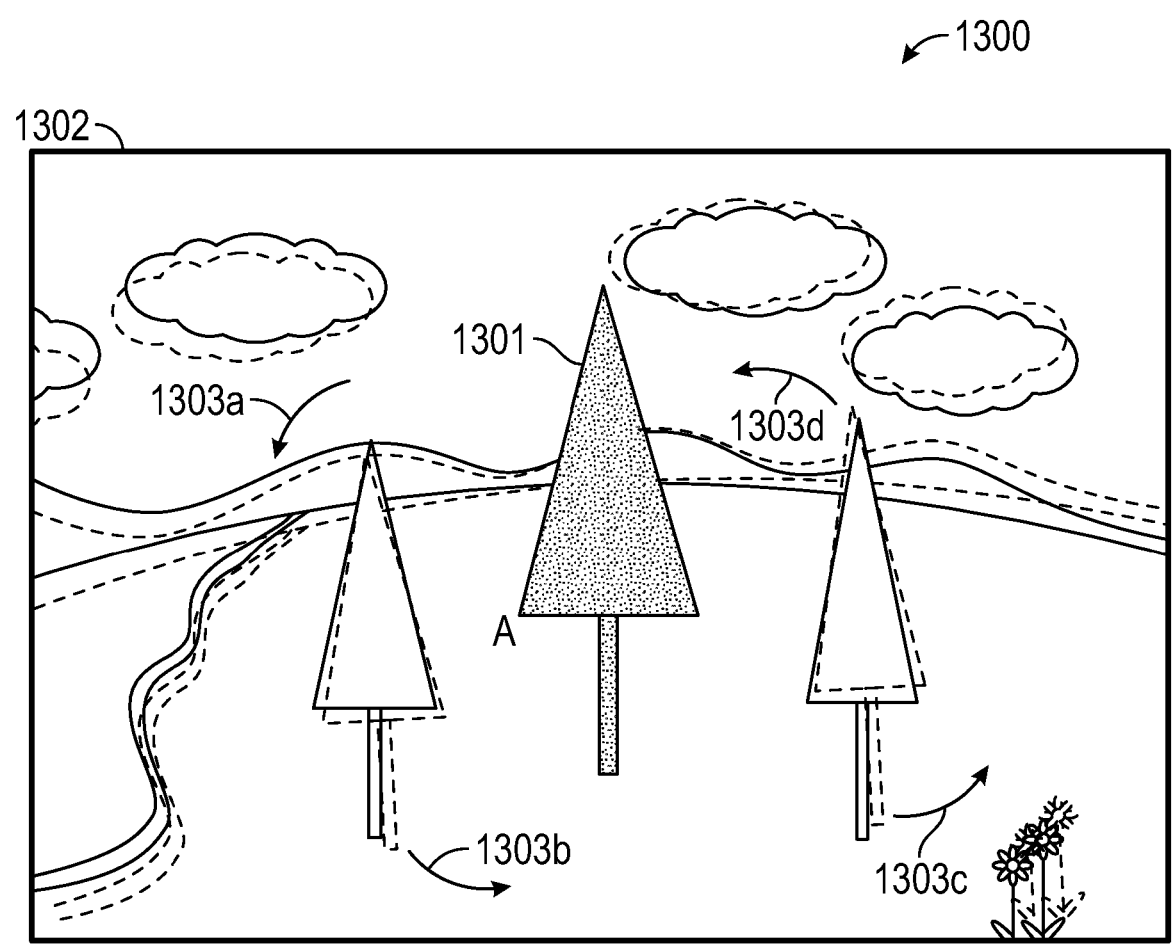
FIG. 10 illustrates an example scene showing a step of the method of FIG. 1.

FIG. 10 illustrates a scene 1300 showing the step of moving the objects lying outside the fixation region. The shaded tree 1301 is the fixation region, and remains stable with respect to the image frame 1302, while the remainder of the objects in the scene are moved or otherwise modified. The figure shows, by way of example, an effect of rotation 1303*a*, 1303*b*, 1303*c*, 1303*d* about the axis of the fixation region. Other forms of motion or modification may be implemented, including but not limited to: rotation, translation, forward or backward motion, zooming, warping, or bending. The type of motion used may be further determined by the eye or head movement of the user of the device embodying the method, and detected via a suitable sensor such as an eye or head tracking system such that the motion of the image corresponds to the motion of the eyes or head, thus enabling an effect of motion parallax between the fixation region and the rest of the scene. The type of motion used may be further computationally animated in unison with the head motion, including those regions of the 3D scene in front of and behind the region of the 3D scene corresponding to the visual fixation coordinate.

Figure 11:
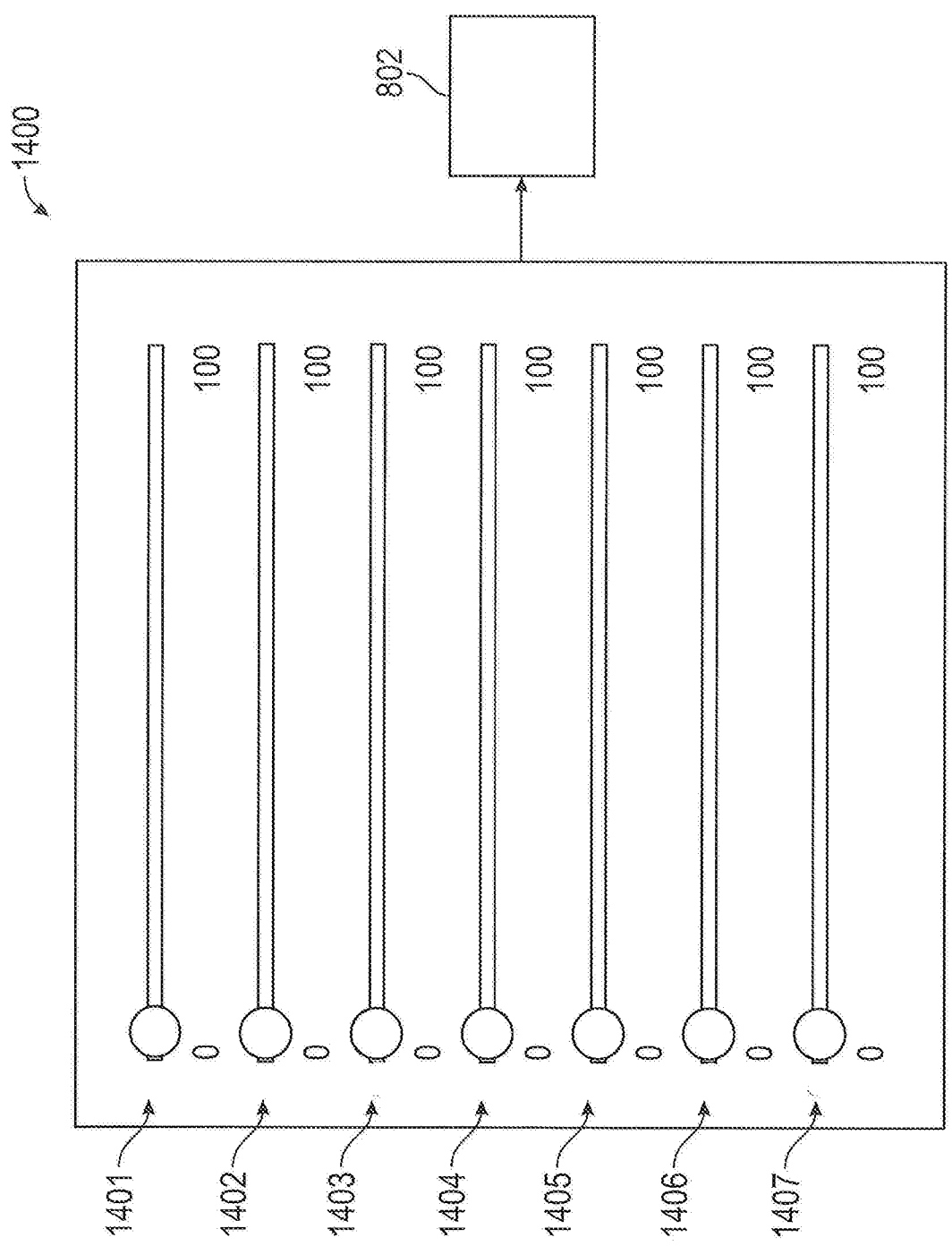
FIG. 11 illustrates a schematic diagram of the user control interface used in an embodiment of the present invention.

FIG. 11 shows a schematic diagram of the user control interface 1400. By way of illustration, in this embodiment, a series of control sliders are linked to values that set the behaviour of the displayed image, which can be modified under user control. The figure shows a set of control sliders, and the output to the computer processor 802. By way of illustration, slider 1401 controls the location of the visual fixation coordinate in the image; slider 1402 controls the region or object within the 3D scene that corresponds to the visual fixation coordinate; slider 1403 controls the magnitude of the region of interest function applied to all objects thereby regulating the sensitivity of the device; slider 1404 controls the degree of magnification factor applied to the relevant region of the 3D scene, thus calibrating the sensitivity of the device; slider 1405 controls the degree of minification factor applied to the relevant region of the 3D scene, thus calibrating the sensitivity of the device; slider 1406 controls speed of the motion or sensitivity of the region or objects in the scene corresponding to the motion of the head of the viewer; slider 1407 controls the direction of motion of the region or objects in the scene corresponding to the motion of the head of the viewer. Slider control values are passed to the computer processor in order to modify and display the image according to the manipulation of the controls by the user.

The invention claimed is:

1. A method of modifying an image on a computational device, the method comprising:
providing, at a processor, image data representative of at least a portion of a three-dimensional scene, the three-dimensional scene representing a field of view visible to a human observer from a viewing point when fixating on a movable visual fixation point within the three-dimensional scene;
displaying, by the processor, the image by rendering the image data on a display device;
computationally processing, at the processor, the image data to enclose an object of the three-dimensional scene in a three-dimensional detection region, the three-dimensional detection region defining a detection sensitivity which is configured to define an extent to which the object is identified as coinciding with a visual fixation coordinate upon which a user is fixating within the three-dimensional scene, wherein the detection sensitivity is lowest proximate to a detection region boundary of the three-dimensional detection region, and wherein the detection sensitivity is inversely proportional to a distance from an object boundary of the object;

capturing user input, by at least one user input capturing means, the user input including a point of gaze of the user, wherein capturing the user input comprises monitoring the point of gaze of the user to determine the visual fixation coordinate upon which the user is fixating in the three-dimensional scene, the visual fixation coordinate representing the movable visual fixation point of the human observer; and modifying the image, at the processor, by:
computationally isolating a fixation region within the image, the fixation region being defined by a subset of the image data representing the object within the three-dimensional scene when the object is predicted to coincide with the visual fixation coordinate based on a velocity value and direction of the point of gaze of the user;
determining a distance between a head of the user and the display device;
spatially reconstructing the subset of the image data to computationally expand the fixation region to a degree determined by the distance between the head of the user and the display device;
spatially reconstructing a remainder of the image data relative to the subset of the image data to computationally compress a peripheral region of the image relative to the fixation region to a degree determined by the distance between the head of the user and the display device and in a progressive fashion as a function of distance from the fixation region;
computationally processing the image data to move the fixation region towards a center of a display of the display device; and
computationally processing the image data to move the peripheral region relative to the fixation region in accordance with a motion of the head of the user to emulate moving the field of view of the human observer while maintaining a position of the movable visual fixation point.

2. The method of claim 1, wherein a size of the three-dimensional detection region is adjustable.

3. The method of claim 1, wherein the three-dimensional detection region extends beyond the object boundary of the object.

4. The method of claim 1, wherein providing the image data and computationally processing the image data are performed before displaying the image on the display device.

5. The method of claim 1, further comprising determining, at the processor, the motion of the head of the user relative to the display device.

6. The method of claim 1, further comprising detecting, at the processor, entry of the visual fixation coordinate into the three-dimensional detection region.

7. The method of claim 1, wherein the fixation region is moved toward the center of the display during movement of the visual fixation coordinate towards the fixation region.

8. The method of claim 1, wherein the image data comprises three-dimensional computer generated data.

9. A computer system, comprising:
user input capturing means configured to capture user input;
a display device configured to display image data;
one or more processors; and
memory storing thereon instructions that, as a result of being executed by the one or more processors, cause the computer system to:
provide the image data, at the one or more processors, the image data representative of at least a portion of a three-dimensional scene, the three-dimensional scene representing a field of view visible to a human observer from a viewing point when fixating on a movable visual fixation point within the three-dimensional scene;
display, via the display device, an image by rendering the image data on the display device;
computationally process, via the one or more processors, the image data to enclose an object of the three-dimensional scene in a three-dimensional detection region which is configured to identify the object as coinciding with a visual fixation coordinate upon which a user is fixating within the three-dimensional scene;
capture the user input, using the user input capturing means, the user input including a point of gaze of the user, wherein capturing the user input comprises monitoring the point of gaze of the user to determine the visual fixation coordinate upon which the user is fixating in the three-dimensional scene, the visual fixation coordinate representing the movable visual fixation point of the human observer; and
modify the image by:
computationally isolating a fixation region within the image, the fixation region being defined by a subset of the image data representing the object within the three-dimensional scene when the object is predicted to coincide with the visual fixation coordinate based on a velocity value and direction of the point of gaze of the user;
determining a distance between a head of the user and the display device;
spatially reconstructing the subset of the image data to computationally expand the fixation region to a degree determined by the distance between the head of the user and the display device;
spatially reconstructing a remainder of the image data relative to the subset of the image data to computationally compress a peripheral region of the image relative to the fixation region to a degree determined by the distance between the head of the user and the display device and in a progressive fashion as a function of a-distance from the fixation region; and
computationally processing the image data to move the fixation region towards a center of a display of the display device.

10. The computer system of claim 9, wherein the user input capturing means comprises a user motion sensor configured to capture motion of the user relative to the display device.

11. The computer system of claim 9, wherein the instructions, as a result of being executed by the one or more processors, further cause the computer system to process the image data to generate a modified image data.

12. The computer system of claim 9, further comprising a control unit, wherein the instructions, as a result of being executed by the one or more processors, further cause the computer system to store the image data and communicate the image data to the control unit.

\* \* \* \* \*